June 18, 1957 A. G. COOLEY 2,796,316

CONTINUOUS OR FLAT-TYPE FACSIMILE RECORDER

Filed Nov. 6, 1952 4 Sheets-Sheet 1

INVENTOR.
A. G. COOLEY
BY E. R. Evans
Attorney

June 18, 1957 A. G. COOLEY 2,796,316

CONTINUOUS OR FLAT-TYPE FACSIMILE RECORDER

Filed Nov. 6, 1952 4 Sheets-Sheet 2

INVENTOR.
A. G. COOLEY
BY E. R. Evans
Attorney

June 18, 1957 A. G. COOLEY 2,796,316

CONTINUOUS OR FLAT-TYPE FACSIMILE RECORDER

Filed Nov. 6, 1952 4 Sheets-Sheet 3

INVENTOR.
A. G. COOLEY
BY E. R. Evans
Attorney

June 18, 1957 A. G. COOLEY 2,796,316

CONTINUOUS OR FLAT-TYPE FACSIMILE RECORDER

Filed Nov. 6, 1952 4 Sheets-Sheet 4

INVENTOR.
A. G. COOLEY
BY E. R. Evans
Attorney

United States Patent Office 2,796,316

Patented June 18, 1957

2,796,316

CONTINUOUS OR FLAT-TYPE FACSIMILE RECORDER

Austin G. Cooley, New York, N. Y., assignor to Times Facsimile Corporation, New York, N. Y., a corporation of New York Application November 6, 1952, Serial No. 319,021

3 Claims. (Cl. 346—74)

This invention relates to a continuous facsimile recorder of the endless carrier or belt type utilizing a recording medium in the form of a sheet or continuous web. The present application is a continuation in part of my prior application, Ser. No. 157,614, filed April 22, 1950, now abandoned.

Facsimile recorders of this type ordinarily employ a plurality of equally spaced stylus needles or recording elements on a flexible belt or endless carrier which traverses the styli across the recording web at synchronous speed or some equivalent drive arrangement. The endless carrier or belt is supported on spaced pulleys or wheels and driven in any suitable manner. The stylus holders on the travelling carrier should follow the same linear track across the recording area to avoid "line feed" or irregular spacing between successive recording lines. Heretofore this requirement has not been met satisfactorily and, in practice, in order to use a guide that will not bind on the stylus holders, line feed causing visible distortion has been deemed unavoidable.

In order to obtain long life and freedom from maintenance and replacement of parts, an endless metal belt of a material such as beryllium-copper alloy is preferably employed. It has been found that this highly elastic material tends to vibrate in the span between the supporting wheels and improved results are obtained if the belt is suitably guided and the vibrations damped.

In general terms, the principal object of the invention is to improve the construction of the stylus recording mechanism to obtain more uniform or substantially distortionless recording at high speeds.

Another object of the invention is to provide a stylus guide employing a magnetic structure for eliminating vibration or undue lateral movement in the stylus carrier or belt more effectively than in the case of ordinary frictional tracks or guides. Preferaly this is accomplished by providing magnetizable lugs or elements on the carrier at or adjacent each of the styli, said lugs projecting into contact with a magnetic guide at the recording area.

Another object of the invention is to provide an improved stylus guide designed to prevent or minimize wear and excessive friction between the stylus carrier and the stationary guide. In its preferred form, the guide embodies a facing strip of porous material, such as sintered bronze, which is impregnated with a lubricant.

Other objects and advantages of the invention will appear from the following description of the preferred embodiment shown in the accompanying drawings, wherein.

Figure 1:
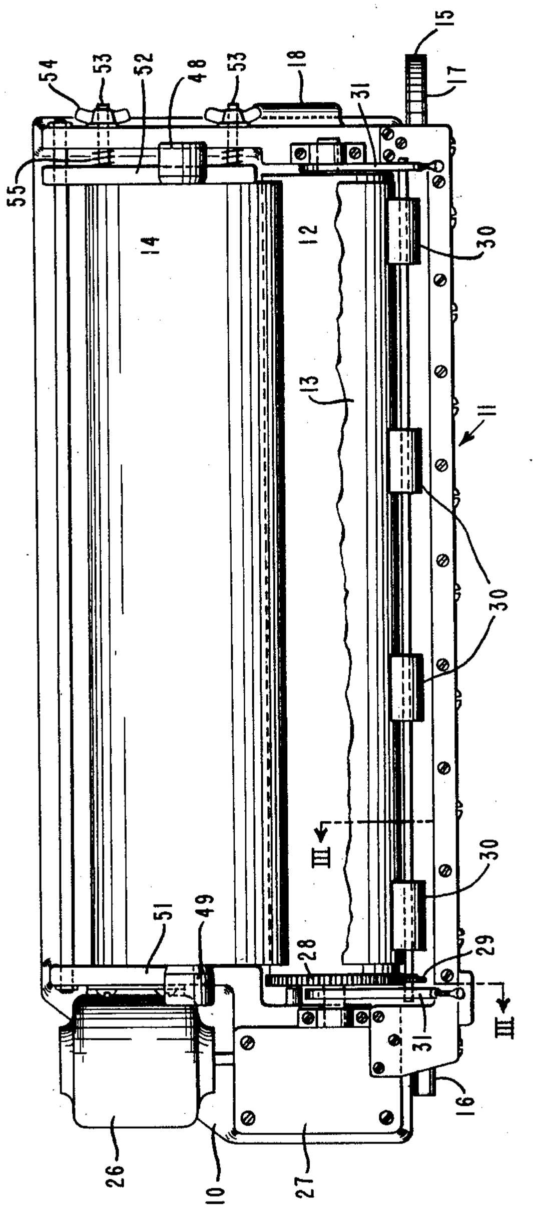
Fig. 1 is a top or plan view of a continuous web recorder embodying the invention.

Referring to Figs. 1 to 5 of the drawings, the facsimile recorder shown comprises a base 10 upon which is mounted a stylus recording mechanism 11 of the current-conducting type in front of the rotatable feed roll 12. The feed roll 12 as shown is adapted to support and feed a sheet or continuous web of recording paper 13 from a supply roll 14.

The stylus recording mechanism 11 preferably comprises an endless stylus carrier or belt 15 of beryllium-copper alloy, stainless steel or other elastic metal having high tensile strength. The stylus carrier or belt 15 is carried on or supported by a pair of spaced wheels 16 and 17 so that a straight span of the belt is adjacent and co-extensive with the recording area on the sheet or web 13. In this manner the stylus needles 19 on the belt are propelled across the width of the recording sheet in succession to effect recording by current flow from the point of each stylus to the recording sheet. The general arrangement of the recorder mechanism shown, except as described hereinafter, is similar to that described and claimed in my prior Patent No. 2,643,174, issued June 23, 1953.

Figure 3:
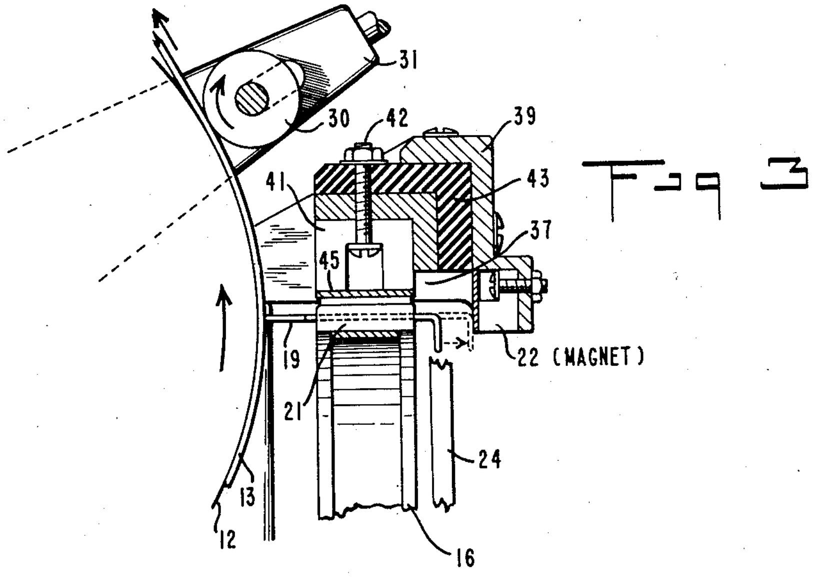
Fig. 3 is a detailed sectional view to an enlarged scale taken on the line III—III of Fig. 1.

As described in said prior patent, the disclosure of which is specifically incorporated herein by reference, the styli 19 are preferably in the form of elongated steel needles or rods frictionally held in a close fitting tubular holder 21 so as to be freely movable into contact with the surface of the recording sheet 13. As shown in Fig. 3, a magnet 22 behind the rear end of the stylus at one side of the web of recording paper serves to retract the stylus to the position shown in dotted lines and thereby lift the tip thereof above the edge of the paper as the stylus commences its traverse across the sheet. After the stylus has cleared the edge of the paper, the stylus is projected forward and held against the surface of the recording sheet 13, for example by magnetic means disposed inside of the feed roll 12. In this manner proper recording pressure is maintained throughout the recording area in spite of friction between the stylus and its holder, wear caused by abrasion at the end of the stylus, and so forth. This feature is disclosed and claimed in my prior Patent No. 2,591,138, dated April 1, 1952. Other means for supporting and indexing the stylus needles may be employed in lieu of that shown herein.

The stylus carrier or belt 15 is propelled at synchronous speed in any suitable manner, as for example by two separate motors as described in my prior Patent No. 2,643,174 referred to above. As shown therein, the pulleys or wheels 16 and 17 may be formed without sprocket teeth and have frictional contact with the smooth inside face of the belt 15, the wheel 17 being rotated by an over-drive motor 18 tending to propel the belt above synchronous speed. If the wheels 16 and 17 are smooth instead of being toothed sprockets or gears as usual in the prior art, the movement of the belt 15 may be made smoother to avoid irregularities in the movement of the belt at high speeds which cause "chatter" or defects in the recording. In order to maintain exact synchronous speed, the belt 15 is held back by the synchronous rotating arm 24 provided with diametrically opposite tip portions engaging lugs 25 on the belt 15 as shown more clearly in Fig. 5. The lugs 25 may be riveted to the belt 15, projecting over the front edge of the belt and serve to index the stylus needles 19 with the required precision with only one of the lugs in contact with the arm 24 during the period when a recording stylus traverses the recording sheet. This minimizes chatter or distortion in recording at high scanning speeds. The synchronous speed-control arm 24 is driven through suitable phasing mechanism from the shaft of a synchronous motor 26, which may also be connected to the shaft of the feed roll 12 through gearing in the gear box 27. The feed roll 12 is provided with a gear 28 at one end thereof meshing with a pinion 29 on the shaft of the rubber friction rollers 30. Alternatively the gear 28 and pinion 29 may be omitted and the friction rollers driven solely by engagement with the recording web 13 and serving merely to hold the web in frictional contact with the feed roll. The phasing mechanism for the synchronous arm 24 may comprise the usual clutch and stop arm as well known in the art, or may be similar to that shown in my prior Patent No. 2,492,621, dated December 27, 1949.

The shaft of the friction rollers 30 is supported in the hinged arms 31, pivoted on the axis of the feed roll 12. The rollers 30 are spring-pressed against the feed roll 12 by springs (not shown) in the arms 31 and the rollers can be released manually by raising them off the feed roll by means of the slidable rods 32 or other releasable locking devices. Other suitable means for releasably holding the friction rollers in position may be used, if desired, or suitable provisions made for threading the recording paper 13 through the machine without lifting the friction rollers 30.

Figure 4:
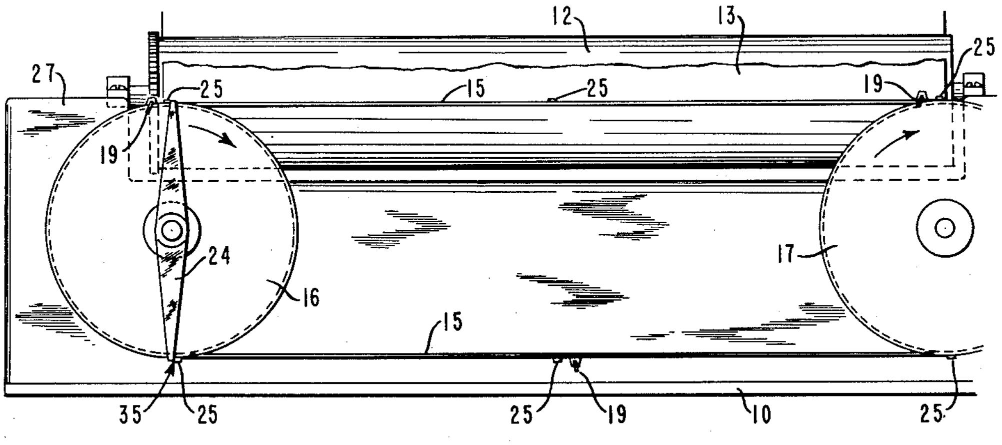
Figs. 4 and 5 are front elevational views of the recorder, Fig. 5 being a detail view of the stylus carrier drive and associated magnetic guide.
Figure 5:
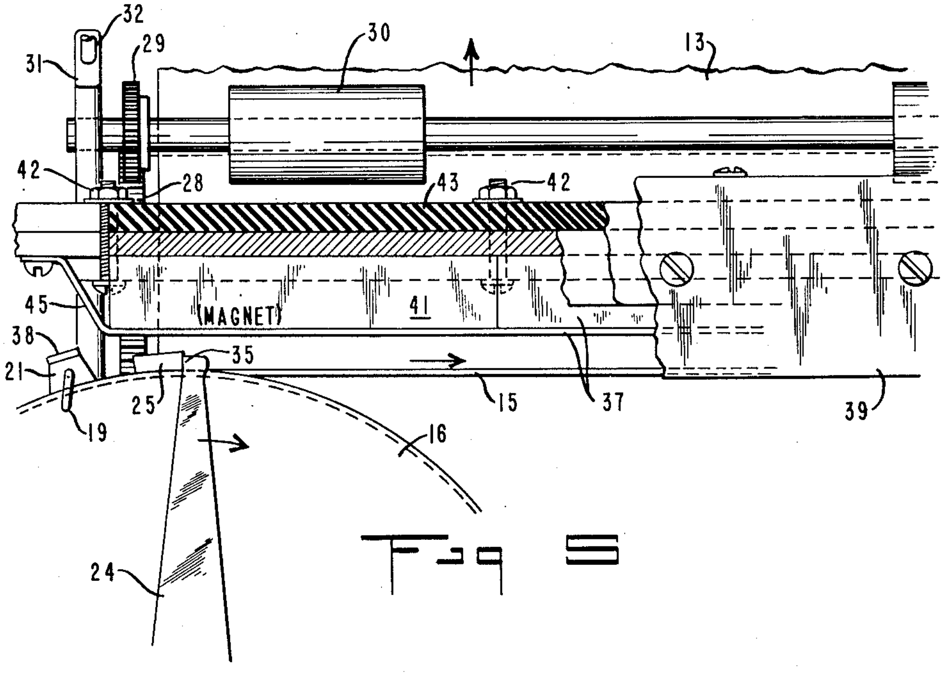

The synchronous speed-control arm 24, as shown in Figs. 4 and 5, is provided with accurately positioned trailing edges 35 engaging the projecting lugs 25 on the carrier 15, said edges 35 being diametrically opposite and so spaced apart with relation to the spacing between successive lugs 25 that a small realinement gap occurs between the arm and each lug as the latter approaches the lower periphery of the pulley 16 in position to engage the arm 24. Thus, as the edge 35 on the upper end of the arm 24 disengages one of the lugs 25 on the stylus carrier 15 as it advances from the position shown in Figs. 4 and 5, the tension on the carrier 15 from the drive motor running above synchronous speed causes the immediate engagement of the next lug 25 with the lower end of the speed control arm 24. After this engagement is effected, the arm 24 maintains the progressive movement of the carrier 15 at a synchronous speed without any irregularity in the speed or loading of the carrier or drive mechanism (which would cause distortion of the recorded copy) for one-half revolution of the arm 24. In this manner the carrier or belt is propelled smoothly at synchronous speed during each traverse of the successive stylus needles across the recording sheet 13 to insure accurate indexing and registration of the recording elements or stylus needles 19. While the carrier as shown has three stylus needles and six lugs, another preferred construction consists of four stylus needles and lugs. This construction is disclosed in my prior Patent No. 2,643,173, dated June 23, 1953, and may be used in carrying out the invention.

In accordance with the present invention, a magnetic guide 37, as shown in Figs. 3 and 5, is provided for the upper span of the stylus carrier 15 adjacent the recording area on the recording web. Each stylus holder 21 is made of steel or is provided with a steel insert or cap 38 which is adapted to engage the lower surface of the horizontal magnetic guide 37. The guide 37 may be supported in any suitable manner, as for example on the bracket 39, and comprises one or more bars 41 of Alnico or other permanent magnet material U-shaped in cross-section, as shown in Fig. 3. These bars form an elongated magnet extending across the width of the recording area and are bolted in place by the fastening means. Obviously, the stylus holders or caps 38 may be formed as magnets engaging a magnetizable or magnetic guide, which is a mere reversal of the construction shown.

Insulation 43 may be interposed between the magnets and supporting brackets 39, if required, for example in a construction where the magnets are not insulated from the stylus holders 21 and guide 37. The facing strip 45 may be non-magnetic or slightly magnetic, for example stainless steel. However it is preferably porous, for example of sintered bronze, and impregnated with a lubricant. If desired, a lubricant such as oil may be supplied to the porous bearing strip through a wick (not shown) in the conventional way. One advantage of the guide 37 over the ordinary mechanical guide or track is that the sliding element 21 and carrier or belt 15 are constrained positively in a vertical direction without undue friction and this guiding function is not affected by wear as in the case of the ordinary track guide which develops play as a result of wear. The complete absence of binds and non-uniform friction loading effects a substantial improvement in the recording quality.

Another important feature of the construction relates to the means for supporting and feeding the web 13 from the supply roll 14. In order to avoid the necessity for guide rolls for maintaining edgewise alinement of the paper between the feed roll 12 and the supply roll 14, and to make the machine more compact, the supply roll is located above and in contact with the feed roll. It has been found the alinement of the paper with the feed roll 12 can be maintained if the supply roll 14 is in frictional contact with the surface of the feed roll, the supply roll constrained against longitudinal movement except for that required to maintain the supply roll in position alongside of the feed roll and finally provision made for maintaining tension continually on the web between the supply roll and the feed roll.

Figure 2:
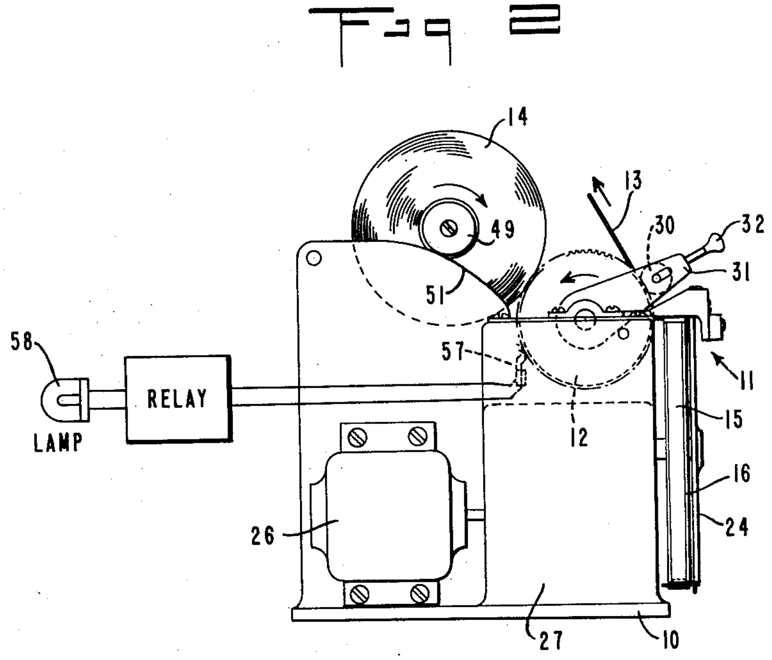
Fig. 2 is an end elevation of the recorder shown in Fig. 1.
Figure 7:
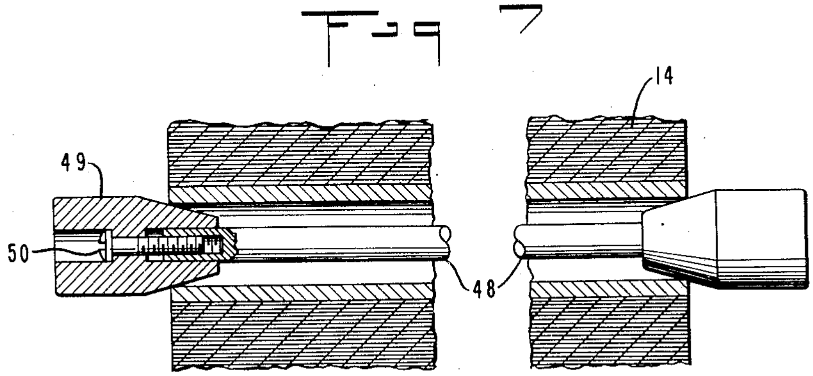
Fig. 7 is a detail of the roll mounting bar.

In accordance with the preferred embodiment of the invention shown, a supporting bar 48 is inserted in the core of the supply roll 14. The bar 48 is provided with a removable tapered plug 49 on one or both ends. The supply roll is clamped to the bar 48 in any suitable manner, as by means of the plug 49 and clamp screw 50 as shown in Fig. 7. With this construction the supply roll may be mounted on the parallel sloping top surfaces of supporting members 51 and 52 on the frame of the machine behind the feed roll 12 with the ends of the bar 48 adapted to roll and slide on said supporting surfaces. Since the bar 48 is clamped to the supply roll it will turn when the supply roll turns by reason of its frictional contact with the feed roll 12. The friction developed between the ends of the bar 48 or the end plugs 49 and the supporting members 51 and 52 result in the tensioning of the web 13 so that the web is held tightly in contact with the feed roll 12 and is advanced without slippage as the feed roll turns. As shown in Fig. 2, the slope of the supporting surfaces 51 and 52 may increase as the supply roll 14 is used up and becomes lighter. In this manner the tension on the web is maintained substantially constant or above a predetermined minimum value.

Figure 6:
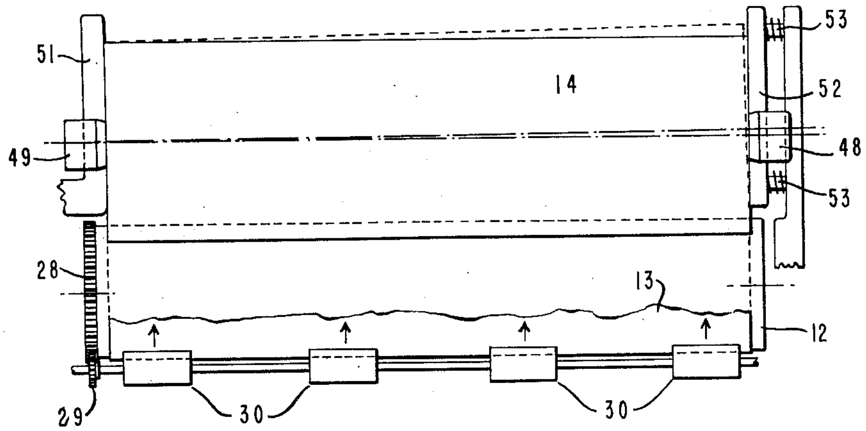
Fig. 6 is a plan view of the recording paper supply roll and feeding mechanism, illustrating the skewing effect encountered with non-uniform rolls.

The supply roll 14 is constrained against longitudinal movement lengthwise of its axis by the end plates or supporting members 51 and 52. However, the rolls of recording paper are usually not wound perfectly true and at times one end of the roll may be slightly larger in diameter than the other as indicated in dotted lines to an exaggerated scale in Fig. 6. Obviously this will cause a slight skewing of the roll since its weight will hold the lower front edge in contact with the back side of the feed roll 12. The plates 51 and 52 are mounted with sufficient clearance to permit this skewing of the supply roll 14 while still preventing substantial dislodgement of the roll lengthwise, and the only effect is a slackening of the tension on one side of the web. When the web straightens out again the supply roll assumes its normal position exactly parallel to and alined with the feed roll 12, and the web feeds properly under all conditions. If desired, one of the end plates 52 may be yieldably mounted on the frame, as by means of the threaded rods 53 carrying wing nuts 54 and springs 55, as shown in Fig. 1. This prevents binding or jamming the supply roll while holding it securely in position.

The mounting of the supply roll 14 directly in contact with the feed roll has obvious advantages since the web is fed properly around the feed roll without the use of intermediate guide rollers and a much more compact construction is obtained. In addition the reloading of the machine when the supply roll is used up is simplified since the new roll is readily mounted in place of the used roll.

Figure 8:
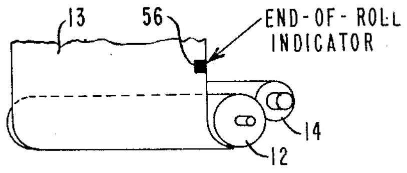
Fig. 8 is a view showing the indicator patch at the inner end of the paper web.

In order to indicate to the operator of the machine that the supply roll is almost used up, one or more spots 56 of insulating paint or other coating material may be placed upon the edge of the web near the end of the supply roll, as shown in Fig. 8. These spots or insulating areas may be placed on the web when the roll is being made, for example when the paper is slit and the roll is being formed on the rewinder. When the roll 14 is used to the point where one of these insulating areas is in contact with the feed roll 12, the contacts 57, Fig. 2, bearing against the surface of the recording paper are employed to operate a lamp 58 or other signal device to call the attention of the operator to the fact that the supply of recording paper is running out. This is important in an automatic continuous web recorder since such machines are normally provided with automatic starting equipment so that they will operate while unattended for considerable periods.

The recorder shown and described above may be started and synchronized in any well known manner, as for example by the use of the synchronous drive and phasing mechanism shown in the prior Patents Nos. 2,492,621 and 2,643,174 referred to above. The synchronous motor 26 may be operated at synchronous speed corresponding to that of the transmitter motor, as for example by driving the motor from the constant frequency source as well known in the art. The drive motor connected to the wheel 17 may be a shaded-pole induction motor or other suitable variable-speed motor normally tending to drive the stylus carrier 15 above synchronous speed and adapted to be retarded by the constant-speed synchronous motor 26 connected to the belt or carrier through the speed-control arm 24. Various modifications in the drive may be made without departing from the scope of the invention, as for example connecting the drive motor to the wheel 16 which also has frictional driving engagement with the belt or carrier 15.

The recording signal current may be applied to the recording stylus needles 19 in any suitable manner, as by means of a contact brush bearing against one of the wheels 16 or 17 where the belt 15 is metallic as described. The ground or return side of the circuit is normally through the metallic feed roll 12 but contacts or brushes bearing against the recording paper 13 may be employed if desired to conduct the current impressed upon the recording sheet by the stylus needles 19.

Various modifications in the recording mechanism may be made, as mentioned above in some instances, since the present invention is concerned with improved means for guiding the stylus holders or carrier through the recording area. In other respects the detailed disclosure given above for the purpose of explaining the invention may be regarded as merely illustrative of a preferred form of recorder in which the invention may be embodied.

I claim:

1. In a facsimile recorder having a recording medium in the form of a sheet or continuous web, means for supporting and advancing said sheet or web, a flexible carrier or belt, a plurality of spaced styli on said carrier or belt adapted to record on said recording medium, means for driving said carrier or belt and styli, magnetizable elements of uniform height rigidly attached to said carrier or belt adjacent said styli, said elements being spaced apart along the entire length of the carrier or belt, and stationary magnetic means for guiding said belt over the recording area, said magnetic means being coextensive with and disposed adjacent the length of belt at said recording area in a position to contact said rigidly attached elements on said carrier or belt as it traverses the recording area.

2. In a facsimile recorder having a recording medium in the form of a sheet or continuous web, means for supporting and advancing said sheet or web through the recorder, a flexible carrier or belt having magnetizable lugs or protruding elements along the length thereof, a plurality of spaced styli on said carrier or belt adapted to record on said recording medium, means for driving said belt and styli, and magnetic means for guiding said belt and styli adjacent to the recording area, said last-mentioned means comprising a fixed elongated magnetic structure parallel to a span of the belt and mounted in a position to be engaged by the magnetizable lugs thereon.

3. In a facsimile recorder having a recording medium in the form of a sheet or continuous web, means for supporting and advancing said web, an endless carrier or belt disposed in front of said sheet or web, a conducting stylus supported on said carrier in position to engage the sheet or web at the recording area, a holder for said stylus having a magnetizable portion, a rectilinear guide for said stylus and carrier adjacent to the recording area and parallel to the span of the carrier, said guide including fixed magnetic means in a position to attract the magnetizable portion of the stylus holder and thereby guide the same positively in a predetermined path without frictional binding.

References Cited in the file of this patent

UNITED STATES PATENTS

| | | |
|---|---|---|
| 1,123,066 | Barber | Dec. 29, 1914 |
| 2,198,654 | Calkins et al. | Apr. 30, 1940 |
| 2,239,395 | Mallory | Apr. 22, 1941 |
| 2,278,919 | Erickson et al. | Apr. 7, 1942 |
| 2,437,242 | Cole et al. | Mar. 9, 1948 |
| 2,492,889 | Royal | Dec. 27, 1949 |
| 2,639,211 | Hallden et al. | May 19, 1953 |